United States Patent Office 3,302,719
Patented Feb. 7, 1967

3,302,719
METHOD FOR TREATING SUBTERRANEAN FORMATIONS
Paul W. Fischer, Whittier, Calif., assignor to Union Oil Company of California, Los Angeles, Calif., a corporation of California
No Drawing. Filed Jan. 25, 1965, Ser. No. 427,921
28 Claims. (Cl. 166—42)

This application relates to the treating of subterranean formations penetrated by a well bore, and more particularly to a method for treating permeable subterranean formations wherein a fluid containing specially compounded, oil soluble, solid particles, useful as selective temporary plugging and propping agents, is injected into the formation. The method of this invention has particular application in hydraulic fracturing of subterranean formations, in well treating processes wherein a treating fluid is injected through a well bore and into a formation penetrated by the well bore, and to the completion of well bores drilled into hydrocarbon-producing permeable formations.

Although high fluid permeability is a desirable characteristisc of a hydrocarbon-producing formation, many well drilling and treating operations are adversely affected when the well bore penetrates such highly permeable formations. The effectiveness and efficiency of these operations are substantially improved by plugging the more permeable strata to reduce the loss of drilling muds, and fracturing and well treating fluids thereto. Accordingly, plugging techniques have been developed for injecting a variety of substances into such formations to reduce the formation permeability. However, most of these prior art plugging agents are either not easily removed and, if deposited in a hydrocarbon fluid-producing zone, tend to effect permanent permeability loss causing decreased hydrocarbon production, or are generally inefficient in plugging the formation. No general purpose temporary plugging agent has heretofore been developed, particularly for use at formation temperatures lower than about 130° F.

A related problem is experienced in propping a fracture created by hydraulic pressure exerted upon the formation. Where permanent propping agents are employed, it is desirable that they be deposited as a monolayer in spaced relationship within the fracture, since excessive propping agent deposition unduly restricts the permeability of the fracture. Spaced positioning can be achieved by codepositing in the fracture a mixture of a permanent propping agent and a temporary propping agent, or spacer. The temporary propping agent is dissolved by the formation fluids, leaving the permanent propping agent remaining in spaced relationship surrounded by flow channels formed by removal of the spacer. The prior art does not teach a satisfactory spacer material for such application, particularly in the case of low temperature formations. Similar difficulty is experienced in adapting known materials to temporary propping of fractured formations.

In any of the aforesaid applications, it is essential that the temporary plugging or propping agent be readily removed from hydrocarbon-producing zones to prevent permanent loss of permeability and attendant reduction in production rate. Removal may be effectively accomplished by utilizing a plugging agent which is soluble in the formation hydrocarbons. Most of the prior art materials, however, are either insoluble under bottom hole conditions, or are so highly soluble that they are difficult to place in the formation and fail to maintain the required plug during the treating operation. It is therefore essential that the plugging agent possess the property of controlled solubility, wherein a satisfactory solid plug will be formed for a period of time, and whereupon the plug will be removed by being slowly dissolved by the well fluid. This solubility characteristic is also essential in a temporary propping agent or propping agent spacer. It is usually advantageous to utilize a material which is insoluble in water, thereby leaving water producing strata permanently sealed. Thus, a selective plugging is effected, the hydrocarbon-producing strata being temporarily plugged and the water-producing strata remaining permanently plugged. On removal of the temporary plugging or propping agent from the hydrocarbon-producing strata, oil and gas production capability is fully restored while water production is permanently eliminated or substantially decreased.

Each of the aforesaid well treating processes commonly require a temporary plugging or propping material capable of being formed into small solid particles of controlled size, preferably by an inexpensive technique. The material should be slightly soluble in the well fluid at formation conditions, and insoluble in water, in order to accomplish the desired selective plugging and complete restoration of hydrocarbon production, even at formation temperatures as low as 90° F. The material should be nontacky on exposure to air at ambient temperatures to avoid agglomeration of the solid particles. Similarly, the particles should not become tacky or sticky on exposure to formation fluids or to treating fluids. Particles which are somewhat resilient possess superior plugging properties, as they deform to effectively fill flow passages. High mechanical and impact strength is desirable to avoid size reduction of individual particles by attrition. The prior art materials used as plugging, propping and spacing agents generally do not possess the aforesaid properties and characteristics essential for effective and efficient selective temporary plugging and propping, and therefore, to a greater or less degree, are unsuited for this purpose.

Accordingly, it is an object of the present invention to provide an improved well treating process for temporarily plugging a permeable subterranean formation to prevent or retard the flow of fluids therethrough. Another object is to provide an improved process for fracturing oil-bearing subterranean formations, and particularly for multiple fracturing of such formations. Another object is to provide a process for fracturing a subterranean formation whereby a propping agent is deposited in the fracture in spaced relationship, thereby increasing the permeability of the fractured formation. Another object is to provide a temporary propping agent for the fracturing of relatively incompetent formations. A further object is to provide an effective lost circulation additive for addition to a well drilling fluid. A still further object is to provide a fluid loss additive to be added to a fluid placed in a well bore which will act to temporarily reduce the formation permeability without effecting a permanent reduction of the hydrocarbon permeability of the formation. Other objects and advantages of my invention will be apparent to those skilled in the art from the description thereof which follows.

I have found that the foregoing objects and their attendant advantages can be attained by treating subterranean formations with a particulate solid material made from homogeneous mixtures, or blends, of selected polymers, hydrocarbon waxes and resins. The compositions of this invention have variable solubilities and softening, or melting points, depending on the particular components of the composition and the proportions of each present. Generally, the polymer and hydrocarbon wax components are solids which are substantially insoluble at ambient temperatures in the hydrocarbon formation fluids and carrier fluids used to deliver these materials to the underground location. The resin component is generally highly soluble in these fluids, even at ambient temperatures. Solid particles of the aforesaid component blends possess solubilities intermediate between those of the individual components. Thus, the particular blend used in each treatment can be selected depending on its melting point, softening point, solubility in the formation fluids, solubility in the carrier fluid, the ambient temperature, and the formation temperature.

The various specific components of the blend function to impart different properties to the final solid product. Specifically, the polymer material adds strength to the ultimate product not otherwise obtainable with blends of waxes and resins alone. The wax component imparts texture, tends to promote the formation of uniform spherical-shaped particles, and reduces the stickiness and tackiness of the final solid product. Further, the wax material may be substantially lower in cost than other blend components, thereby adding economic incentive for increasing the proportion of wax in the blend. As previously mentioned, the resin component may be the only material in the blend composition which is highly soluble in the formation fluids, and therefore imparts the solubility characteristic to the final solid product. Although all of the individual components of the mixture may not be truly soluble in the formation fluids, they nevertheless are dispersible into these fluids, and are removed from the formation as effectively as though they were truly soluble. Accordingly, it is the proportion of the oil-soluble solid resin in the blend which largely controls the solubility of the final solid product and imparts to it the particular characteristic of controlled solubility or dispersibility, which renders such compositions particularly useful as temporary plugging and propping agents.

The polymer component of my homogeneous particulate solid compositions comprises (1) addition polymers of an olefin having between two and four carbon atoms in the monomer molecule, such as polyethylene, polypropylene and polybutylene; (2) copolymers of an olefin having between two and four carbon atoms and an alkyl acrylate containing not more than four carbon atoms in the alkyl group, such as esters formed by the reaction of acrylic acid and an alcohol having no more than four carbon atoms; (3) copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Preferred polymer component materials include polyethylene, polypropylene, polybutylene, copolymers of ethylene and vinylacetate, and copolymers of ethylene and methyl methacrylate. Although the solid particle compositions of this invention may contain other polymeric materials, the term "polymer component" as used herein shall include materials selected from the aforesaid group of polymer and copolymer materials. A single polymer component, selected from the above classes of polymeric substances, may form the polymer component of my composition or two or more such materials may be combined in such blends. Each of the aforesaid polymer components will impart somewhat different properties of strength, ductility, solubility, and density to the final solid composition. Desired properties not obtainable with a single polymeric material can often be achieved by blends of two or more of these polymers.

As previously mentioned, the wax component of the compositions adds texture to solid particles formed thereof, particularly with regard to reduction of the tackiness of these particles, and adds bulk to the composition, thereby reducing its cost. Suitable waxes include crystalline and microcrystalline petroleum waxes, as well as beeswax, carnauba wax, condellila wax, montan wax, and the like. Preferred for many of the uses of this invention are the paraffinic petroleum waxes comprising primarily straight chain hydrocarbons containing eighteen or more carbon atoms, many of which have melting points between about 130° F. and about 165° F. A particularly preferred paraffin wax comprises a fully refined petroleum paraffin crystalline wax having a melting point between about 130° F. and about 134° F. The particular wax selected largely affects the air melting and air softening temperature of the blend composition, as distinguished from solubility effects in a liquid solvent. Incorporating a wax of higher melting point into the blend generally results in the final product having an increased air melting and air softening temperature. The air softening point is important to insure proper stability of solid particles of the

TABLE 1.—COMMERCIAL RESIN COMPONENTS

| Manufacturer | Trade Name | Material |
| --- | --- | --- |
| Hercules Powder Co | N. Wood Rosin | Rosin. |
| Do | W. G. Wood Rosin | Do. |
| Do | Poly-pale Ester 1 | Ethylene glycol ester of polymerized rosin. |
| Do | Poly-pale Ester 10 | Glycerol ester of polymerized rosin. |
| Do | Ester gum 8L | Glycerol ester of rosin. |
| Do | Pentalyn A | Pentaerythritol ester of rosin. |
| Do | Pentalyn C | Pentaerythritol ester of polymerized rosin. |
| Do | Pentalyn 802A | Phenolic-modified pentaerythritol ester of rosin. |
| Do | Cellolyn 102 | Modified pentaerythritol ester of rosin. |
| Do | Dymerex | Dimerized abietic acid. |
| Do | Pentalyn K | Pentaerythritol ester of dimeric resin acids. |
| Do | Lewisol 28 | Maleic-modified rosin ester. |
| Do | Cellolyn 21 | Phthalate ester of hydroabietyl alcohol. |
| Rohm & Haas Co | Amberol ST-137 | Phenol formaldehyde resin. |
| Do | Amberol ST-137X | Do. |
| Do | Amberol F-7 Ex. Lt | Rosin-modified phenol formaldehyde resin. |
| Reichhold Chem. Co | Pentacite P 43-406 | Do. |
| Rohm & Haas Co | Amberol 801 Ex. Lt | Rosin-modified maleic anhydride resin. |
| Reichhold Chem. Co | Beckacite 1124 | Maleic anhydride resin. |
| Pennsylvania Ind. Chem. Co | Piccopale 85 | Aliphatic petroleum hydrocarbon resin. |
| Do | Piccopale 100 | Do. |
| Do | Piccopale H 100 | Hydrogenated aliphatic petroleum hydrocarbon resin. |
| Neville Chem. Co | Nevcham 100 | Aromatic hydrocarbon resin. |
| Do | LX 685-125 | Hydrocarbon resin. |
| Do | LX 685-180 | Do. |
| Do | LX 1000 | Do. |
| Pennsylvania Ind. Chem. Co | Piccolyte S-70 | Polyterpene resin. |
| Do | Piccolyte S-85 | Do. |
| Do | Piccolyte S-115 | Do. |
| Do | Piccolyte XA-115 | Polymerized alpha-terpene. |
| Do | Piccolyte XTP-100 | Terpene-phenol resin. |
| Do | Piccolyte XTP-135 | Do. |
| Armour Chem. Co | Armid C | Fatty amide. |
| Do | Armid HT | Do. |
| Do | Arquad 2 HT-100 | Fatty diamine. |
| Rohm & Haas Co | Uformite QR-336 | Polymerized triazine formaldehyde resin. | composition when stored or handled at relatively elevated ambient temperatures. Air softening temperatures may be as much as 40° F. below the air melting temperature, depending on the material. Although these waxes are generally insoluble in formation fluids below their melting point, they are dispersible in hydrocarbon formation fluids at temperatures down to about 90° F. when admixed with the polymer and resin components of this invention.

The third essential component of the present composition is a resin selected to impart the desired solubility to the final composition. These oil-soluble resins are to be distinguished from the polymer component defined above. The principal characteristics required of the resin component are that it is solid at ambient temperatures and soluble in hydrocarbon well fluids at formation temperatures. Broadly, any material meeting these requirements can be used as the resin component of the compositions. I have, however, found several different materials which impart superior properties to these compositions; these materials being generally rosin and rosin derivatives such as polymerized rosin and rosin esters phenol formaldehyde resins, certain maleic anhydride resins, polymerized hydrocarbon resins, polyterpene resins, fatty amides and diamines, and polymerized triazine formaldehyde resins, many of the aforesaid materials being available commercially. Some of the commerical materials especially suitable as the resin component are listed in Table 1.

Suitable rosin based derivatives include natural rosin; polymerized rosin; esters such as the glycerol and pentaerythritol esters of rosin, and the ethylene glycol, glycerol, and pentaerythritol esters of polymerized rosin; modified esters as the phenolic-modified pentaerythritol and maleic-modified esters of rosin; dimerized abietic acid; pentaerythritol esters of dimeric resin acids; and the phthalate ester of hydroabietyl alcohol. Commercial hydrocarbon resins which have proven particularly suitable as the resin component of my invention include aromatic and aliphatic hydrocarbon resins, petroleum based aliphatic hydrocarbon resins, hydrogenated hydrocarbon resins, and particularly low molecular weight resins obtained by polymerizing unsaturated petroleum hydrocarbons in the presence of aluminum halide catalyst. These resins are available in various grades melting from about 70° C. to about 110° C., a preferred resin melting about 100° C.

Other resins useful as the resin component of my blend include phenol of formaldehyde and rosin-modified phenol formaldehyde resins; maleic anhydride resin; polyterpene resin; terpene-phenol resin; and polymerized triazine formaldehyde resin. Certain non-resinous materials such as fatty amides and fatty diamines may be substituted for the aforementioned resinous materials.

The phenol formaldehyde resins suitable for use in the aforesaid composition are generally condensation products of phenol and formaldehyde. A preferred phenol formaldehyde is obtained by the condensation of alkyl-substituted para-phenols, or para-xylols, with formaldehyde to obtain an oil-soluble, linearly-linked, polymeric resin melting between about 60° C. and about 90° C. The rosin-modified phenol formaldehyde resin is obtained by condensing the reactants in the presence of rosin.

The polyterpene resins are obtained by polymerizing unsaturated terpenes to obtain an amorphous, thermoplastic acidic resin. One group of polyterpenes essentially comprises polymerized beta-pinene, while another group essentially comprises polymerized alpha-pinene. Such polymers may have melting points from about 10° C. to about 135° C. The lower melting point grades are generally unsuitable as they are liquids at ambient temperature, or melt under bottom hole conditions causing too rapid dispersion of the solid composition. The higher melting point grades, melting above about 115° C., may be undesirable in specific applications, especially where relatively low temperature formations are to be treated.

The final blended product is readily prepared by melting the individual components and then combining the resulting liquids in the proper proportions. Alternatively, the solid components can be combined in the proper proportion and then melted to achieve a homogeneous liquid mixture. In either case, the proportion of each component is selected to impart the previously disclosed important properties to the final solidified product. Generally, blend compositions suitable for treating subterranean formations contain between about 20 and about 40 weight percent polymer component, between about 10 and about 60 weight percent wax component, and between about 15 and about 70 weight percent resin component. The proportion of resin component must be increased toward the 70 weight percent limit, with corresponding decreases in the proportions of polymer component and wax component, to achieve a solid product soluble in petroleum at temperatures of about 90° F. The proportion of resin component can be decreased in those applications at higher formation temperatures. Typical blend compositions from which the oil soluble solid polymer-wax-resin particles of my invention can be formed are listed in Table 2.

TABLE 2.—TYPICAL BLEND COMPOSITIONS
[All compositions weight percent]

| Polymer Component | Wax Component | Resin Component |
| --- | --- | --- |
| 1. 20% polyethylene | 15% 130/134 wax | 65% Rosin-modified phenol formaldehyde resin (Hercules Powder Co. Dymerex). |
| 2. 25% copolymer polyethylene-vinyl acetate, 5% copolymer polyethylene-methyl methacrylate. | 15% 130/134 wax | 55% Rosin ester polymer (Hercules Powder Co. Polypale No. 1). |
| 3. 25% copolymer polyethylene-vinyl acetate | 25% 130/134 wax | 50% Phenol formaldehyde resin (Rohm & Haas Co. Amberol ST-137). |
| 4. 25% copolymer polyethylene-vinyl acetate, 5% copolymer polyethylene-methyl methacrylate. | 30% 130/134 wax | 40% Rosin-modified maleic anhydride resin (Rohm & Haas Co. Amberol 801). |
| 5. 25% copolymer polyethylene-vinyl acetate, 5% copolymer polyethylene-methyl methacrylate. | 50% 143/150 wax | 20% Petroleum hydrocarbon resin (Penn. Ind. Chem. Co. Piccopale 100). |
| 6. 20% polyethylene | 15% 130/134 wax | 65% Hydrogenated petroleum hydrocarbon resin (Penn. Ind. Chem. Co. Piccopale H-100). |
| 7. 25% copolymer polyethylene-vinyl acetate, 5% copolymer polyethylene-methyl methacrylate. | 10% 143/150 wax | 60% Polystyrene-terpene resin (Penn. Ind. Chem. Co. Piccolastic A-50). |
| 8. 30% copolymer polyethylene-methyl methacrylate | 20% 143/150 wax | 50% Polyterpene resin (Penn. Ind. Chem. Co. Piccolyte S-85). |
| 9. 25% copolymer polyethylene-vinyl acetate, 5% copolymer polyethylene-methyl methacrylate. | 30% 130/134 wax | 40% Methyl abietate (Hercules Powder Co. Ester gum 8L). |
| 10. 25% copolymer polyethylene-vinyl acetate, 5% copolymer polyethylene-methyl methacrylate. | 30% 130/134 wax | 40% Abietic acid (Hercules Powder Co. W. G. Wood Rosin). |
| 11. 25% copolymer polyethylene-vinyl acetate, 5% copolymer polyethylene-methyl methacrylate. | 30% 130/134 wax | 40% Polymerized rosin (Hercules Powder Co. Pentalyn C). |
| 12. 30% copolymer polyethylene-vinyl acetate | 30% 130/134 wax | 40% Pentaerythritol ester resin (Reichhold Chem. Co. Pentacite P-406). |
| 13. 20% copolymer polyethylene-vinyl acetate, 5% copolymer polyethylene-methyl methacrylate. | 60% 130/134 wax | 15% Maleic anhydride resin (Reichhold Chem. Co. Beckacite 1124). |
| 14. 20% copolymer polyethylene-vinyl acetate | 10% 130/134 wax | 70% Alpha terpene phenolic resin (Penn. Ind. Chem. Co. Piccolyte XTP-100). |
| 15. 35% copolymer polyethylene-vinyl acetate, 5% copolymer polyethylene-methyl methacrylate. | 40% 143/150 wax | 30% Polyterpene resin (Penn. Ind. Chem. Co. Piccolyte S-85). |

As previously disclosed, the composition must be formed into solid particles to be advantageously employed in the well treating processes described herein, and most preferably is formed into small spherical particles of substantially uniform size, the size depending on the particular treating application. The molten compositions of this invention are readily formable into solid particles of the desired size by several techniques such as prilling, dispersion, extrusion, etc., and the solid composition can be formed into particles by grinding, cutting, tearing, etc. One technique of manufacture employing the molten composition comprises violently agitating the molten composition within a body of non-solvent liquid, such as water, containing a finely divided solid, such as calcium carbonate. It is essential that the non-solvent liquid system not contain any material capable of forming solid colloidal dispersions or emulsions with the composition when violently agitated. The subdivided molten material, maintained in constant movement while cooling below the solidification point of the composition, usually assumes a somewhat spherical particle shape. Cooling or quenching of the subdivided particles can be carried out in any convenient manner, but usually comprises the introduction of large amounts of additional cool, non-solvent liquid to the subdivided particles dispersed in the original body of non-solvent liquid. Alternatively, ice may be added as a coolant to the non-solvent liquid.

A preferred technique for forming the blended liquid components into solid spherical particles comprises subdividing the molten blend by injection into a turbulently flowing stream of hot non-solvent liquid, such as water or the like, preferably heated to a temperature above the melting point of the blend, and solidifying the subdivided droplets in a relatively quiet reservoir of cooled non-solvent liquid. Injection of the blend into the moving non-solvent liquid stream is preferably made at an angle relative to the axis of the non-solvent liquid flow conduit, and preferably at a point on the bottom of the flow conduit. Thus, in a preferred method, the molten blend is injected upwardly into a stream of non-solvent liquid heated to a temperature above the melting point of the blend and turbulently flowing through a horizontal flow conduit, the blend being injected into the non-solvent liquid at an angle of less than 90 degrees from the axis of the non-solvent liquid flow conduit. The shear force of the turbulently flowing non-solvent fluid causes the injected blend to be subdivided into droplets of substantially uniform size determined in part by the non-solvent liquid flow velocity, blend injection rate, and the angle of injection. Since the droplets are less dense than the non-solvent liquid, they rise when discharged into a relatively quiet reservoir, thereupon assuming a substantially spherical shape which is retained on solidification.

With the aforesaid preferred solidification process the particle sizes may be rather closely controlled within a size range of from about 0.25 inch to about 0.006 inch, or approximately the size particles which will pass a number 3 U.S. Standard sieve and be retained on a number 100 U.S. Standard sieve. These particles are often suitably sized for use without further size separation, however, if desired the particles may be classified by any of the common size separation techniques.

As previously mentioned, the various components of my composition must be capable of forming a homogeneous mixture when mixed together. Homogeneity may be enhanced by the addition of a solubility modifier to the mixture to increase the mutual solubilities of the various components. Suitable solubility modifiers include naphthalene; solid aliphatic alcohols containing between about 12 and about 20 carbon atoms, and particularly the primary mono-hydroxy aliphatic alcohols having between about 12 and about 20 carbon atoms such as 1-dodecanol, 1-tridecanol, 1-tetradecanol, 1-pentadecanol, 1-hexadecanol, 1-heptadecanol, 1-octadecanol, 1-nonadecanol, and 1-eicosanol; and alkyl substituted phenols having at least 3 and not more than 8 carbon atoms in the alkyl group, such as isopropyl phenol, isobutyl phenol, amyl phenol, hexyl phenol, heptyl phenol and octyl phenol. These solvent modifiers are added to the formulation prior to solidification into the final particle form in amounts up to 10 weight percent of the total composition, and preferably in amounts of between about 1 and about 2 weight percent. Not only is mutual solubility enhanced, but small quantities, less than the aforesaid 10 weight percent, improve the texture of the solid particle product and increase the solubility of the particles in the formation fluid.

In the broadest sense, my well treating process comprises injection through a well bore and into a subterranean formation of solid particles of the aforesaid composition as a suspension in a liquid carrier fluid. This treatment can comprise a single temporary and selective plugging step, or it may be an integral part of a comprehensive fracturing, well drilling, acidizing, or washing process.

The composition of my invention is particularly useful in the fracturing of subterranean formations, wherein solid particles thereof can be used as temporary prefracturing plugging agents, fluid loss additives, intermediate temporary plugging agents, temporary propping agents, and as propping agent spacers. When used as fluid loss additives, propping agents and spacers, the particles are suspended in the fracturing fluid injected into the well bore. Otherwise, the particles may be suspended in the fracturing fluid or in another fluid injected separately from the fracturing fluid.

In a typical fracturing application making full use of solid particles of my composition, an initial injection of particles is made to plug existing fractures and flow channels. The particle sizes selected for this pre-fracturing plugging step will depend on the expected nature and structure of the formation and the type of liner or casing employed. Typically, a particle size within the range passing a number 6 U.S. Standard sieve and being retained on a number 100 U.S. Standard sieve is used for plugging, and preferably a size within the range passing a number 6 being retained on a number 20 U.S. Standard sieve. Injection of the plugging agent may be made as a suspension in a fluid containing up to about 12 pounds of solid particles per gallon of fluid. In suspensions above about 12 pounds of solids, the solids become the continuous phase and the system loses its fluid characteristics. A preferred plugging agent suspension for pre-plugging prior to hydraulically fracturing comprises a suspension of between about 4 and 8 pounds of particles per gallon of fracturing fluid.

A highly satisfactory general purpose plugging agent comprises a suspension of solid substantially spherical-shaped particles of the aforesaid composition, the particles having a size distribution wherein between about 30 to 50 weight percent of the particles are within the size range passing a number 6 and being retained on a number 20 U.S. Standard sieve, between about 10 and about 20 weight percent of the particles are within the size range passing a number 20 and being retained on a number 40 U.S. Standard sieve, between about 20 to 30 weight percent of the particles are within the size range passing a number 40 and being retained on a number 60 U.S. Standard sieve, and between about 10 and about 20 weight percent of the particles are within the size range passing a number 60 and being retained on a number 100 U.S. Standard seive.

Fracturing is accomplished by injecting a fracturing fluid into the well bore at a relatively high volume flow rate and at a relatively high pressure until sufficient force is exerted on the subterranean formation to start a fracture therein. This initial injection of fracturing fluid is known as a spear-head injection and usually does not contain propping material, although fluid loss additive may be added. Smaller size particles are usually preferred for fluid loss additives, these particles usually being smaller than about number 20 U.S. Standard sieve size and preferably within a size range which will pass a number 20 and be retained on a number 100 U.S. Standard sieve.

A fracture opened by hydraulic pressure must be held open when the hydraulic pressure is removed to effectively improve formation permeability. In practice this is accomplished by injecting a solid propping agent into the fracture prior to release of the hydraulic pressure. However, deposition of these solids in the fracture tends to reduce permeability and to decrease flow through the fracture. Preferably, the propping agent is deposited in the fracture as a mono-layer of particles in spaced relationship, the distance of the spacing being sufficiently close to provide support for the overburden without crushing the propping material, yet far enough apart to provide flow channels therearound.

On completion of the spearhead injection, propping agent injection is started by suspending a suitable permanent or temporary propping agent in the fracturing fluid injected into the well bore. Typical permanent propping agents which may be used include small solid particles of sand, glass beads, crushed walnut shells and like material. Preferred temporary propping agents are solid particles of the aforesaid polymer-wax-resin composition. The propping agent injection is usually started at an initial rate of about ½ pound of propping agent per gallon of fluid, and increased to a final injection ot exceeding about 12 pounds per gallon and usually not exceeding about 8 or 9 pounds of solids per gallon. The injection of a high volume flow of fracturing fluid at high pressures is continued during this step and accomplishes extension of the initially formed fracture and deposition of the propping material therein. Fracturing fluid flow rates of about 60 to about 100 barrels per minute and pressures up to about 3000 p.s.i.g. are frequently required to accomplish fracturing by this method.

Superior results are often achieved by depositing a mixture of selected solid particles of my composition and a permanent propping agent in the fracture. The temporary propping agent is dissolved in the formation fluid leaving the permanent propping agent deposited in spaced relationship, thereby substantially increasing the permeability of the fracture. Where such spacers are used, they are preferably of the same size distribution as the permanent propping agent and are preferably added in sufficient quantity to achieve permeability without sufficient loss of support as to permit collapse of the fracture. Usually not more than about 50 volume percent of temporary propping agent can be used in this manner, i.e., a mixture of not more than approximately 50 volume percent of temporary propping agent and at least about 50 volume percent of permanent propping agent.

Where multiple fractures are desired, it is usually necessary to deposit a temporary plug in previously formed fractures before sufficient hydraulic pressure can be generated to cause subsequent fracturing. Solid particles of the composition of this invention can be used to temporarily seal the fracture during subsequent fracturing steps. These particles are deposited in the fracture as a suspension in the fracturing, or other liquid carrier fluid, in a manner similar to that previously described. Upon completion of the fracturing process the well is returned to production and the temporary plugging and propping agents are slowly dissolved by the formation hydrocarbon fluids, in this manner being essentially completely removed.

Many formations are sufficiently hard to be susceptible to fracturing, but are not hard enough to prevent resealing of the propped fracture under the load of high overburden pressures when conventional permanent propping agents are employed. In such cases fracture permeability may be achieved by depositing a temporary propping agent in the fracture, the incompetent formation closing around the individual particles of propping material on release of the hydraulic fracturing pressure. The propping agent is then dissolved by the formation fluid to provide a honey-comb type structure along the fracture plane, thereby increasing the formation permeability.

The need for the temporary plugging of permeable formations is not limited to hydraulic fracturing, but can arise in many well treating processes wherein a fluid is injected into a well bore, such as encountered in acidizing, washing, etc. In each of these processes, the treatment may be ineffective, or inefficient, because of the loss of large quantities of the liquid treating fluid into the permeable formation. In such applications, it is highly desirable to temporarily plug or seal flow passages into the formation, thereby achieving better utilization of the fluid.

Similar problems are experienced in drilling a well bore into a permeable formation as the drilling fluid tends to flow into the formation rather than returning to the surface. The permeability can be sufficiently high that the entire fluid stream passes into the formation, thus resulting in loss of fluid circulation. In some cases the drilling fluid comprises a clay suspension, or mud, which will effect plugging of the permeable formation, thereby accomplishing restoration of the fluid circulation. Various fibrous and granulated materials, such as shredded or granular particles of asbestos, mica, plastics, cotton fibers, cellophane flakes, chopped rope, and like materials, known as lost circulation additives, may be added to the drilling fluid to promote plugging of fissures and cracks, thus reducing the formation permeability and minimizing drilling fluid loss. While such materials are generally satisfactory in preventing drilling fluid loss when drilling through non-productive zones, a hydrocarbon-producing zone can be permanently damaged by the entry of drilling fluid thereinto, particularly where the fluid is the suspended clay type, or contains the aforesaid lost circulation additives, as the plug formed therein is permanent and the sealing materials either prevent subsequent oil and gas production, or at least reduce production substantially. Mechanical techniques often used to remove drilling mud and lost circulation additives from the well bore wall may effect partial restoration, but such techniques are not highly successful, particularly where the fluid has penetrated into the formation. It is highly desirable that the completion of a well in a permeable hydrocarbon-producing zone be made without permanently plugging the formation. Hence, the ultimate well productivity may be greatly improved by the use of an effective temporary plugging agent to seal the formation when drilling into the productive zone.

A suitable drilling fluid for completion of a well bore in a permeable hydrocarbon-producing formation comprises a suspension of the polymer-wax-resin particles of this invention in a pumpable non-solvent carrier fluid. Conventionally, the drilling fluid is circulated from the surface to the drilling zone and returned to the surface. A portion of the solid polymer-wax-resin particles suspended in the drilling fluid is deposited in formation flow channels thereby preventing or restricting the entry of substantial quantities of drilling fluid into the formation. The circulating drilling fluid also conventionally serves to cool the drill bit and to carry cuttings from the drilling zone to the surface. A preferred drilling fluid comprises a suspension of between about ½ and about 8 pounds of solid particles per gallon of carrier fluid, the particles being within a size range which will pass a number 6 and be retained on a number 100 U.S. Standard sieve.

The following examples are illustrative of my invention, but are not intended as limitations thereof:

*Example I*

A number of polymer-wax-resin compositions containing solubility modifiers were compounded and formed into substantially spherical-shaped particles by the conventional dispersion method. Weighed portions of the individual components, amounting to a combined weight of approximately 100 grams for each blend, were melted by heating in separate glass beakers. A homogeneous liquid component blend was formed by slowly combining the liquefied ingredients while heating and gently stirring with a glass rod. Approximately 50 grams of the resulting homogeneous liquid mixture was then slowly added to a violently agitated aqueous calcium carbonate suspension contained in a Waring Blendor. The calcium carbonate suspension was a mixture of about 50 grams of finely-divided calcium carbonate in approximately 1000 ml. of water heated to a temperature of about 200° F. Agitation was continued for about 4 minutes and then ice was added to cool the liquid to a temperature below the solidification temperature of the blend. The solid particles formed thereby were recovered by straining through a number 100 U.S. Series sieve. The blend compositions, air softening temperatures and dynamic solubilities of the spherical products are reported in Table 3.

Dynamic solubility is determined by passing a flowing stream of crude oil over a sample of test particles in an apparatus maintained at 90° F. Crude oil flow is controlled at approximately ¾ ml. per minute. The dynamic solubility is reported as the percent of material dissolved in the stated elapsed time.

Air softening temperature is determined by heating a small quantity of the solid composition in a double walled test tube. Alternatively, two test tubes of different diameters are employed, the tube being held spaced apart by a small asbestos pad inserted into the bottom of the larger tube. A thermometer and a stiff stirring wire are inserted into the sample. The heating rate is controlled to less than about 4° F. per minute. During heating, the sample is gently stirred with the wire. The temperature at which the material appears sticky, or adheres to the stirring wire is the air softening temperature.

Two polymer-wax compositions were compounded and formed into substantially spherical-shaped particles in the above manner. Air softening temperatures and dynamic solubilities at 90° F. were determined and are reported in Table 3. The polymer-wax compositions were substantially insoluble in the crude oil at 90° F., whereas the compositions containing the oil-soluble resins all possessed substantial solubility.

TABLE 3.—AIR SOFTENING TEMPERATURES AND DYNAMIC SOLUBILITY RESULTS

| | Air Softening Temperature, °F. | Dynamic Solubility, 90° F. | |
| --- | --- | --- | --- |
| | | Percent Dissolved | Time, hours |
| 1. 14% polyethylene, 84% 130/134 wax. | 135 | Nil | 150 |
| 2. 30% polyethylene, 70% 160/165 wax. | 175 | Nil | 150 |
| 3. 12% copolymer ethylene-vinyl acetate, 11% polyethylene, 15% 130/134 wax, 61% rosin-modified phenol formaldehyde resin (Hercules Powder Co. Dymerex), 1% naphthalene. | 120 | 99.9 | 168 |
| 4. 20% copolymer ethylene-vinyl acetate, 15% 130/134 wax, 61% rosin-modified phenol formaldehyde resin (Hercules Powder Co. Cymerex), 4% naphthalene. | 110 | 90 | 70 |
| 5. 20% copolymer ethylene-vinyl acetate, 15% 130/134 wax, 61% rosin ester polymer (Hercules Powder Co. Polypale No. 10), 4% naphthalene. | 110 | 100 | 94 |
| 6. 20% copolymer ethylene-vinyl acetate, 15% 130/134 wax, 64% hydrogenated petroleum hydrocarbon resin (Penn. Ind. Chem. Co. Piccopale H-100), 1% naphthalene. | 112 | 98 | 94 |
| 7. 20% copolymer ethylene-vinyl acetate, 15% 130/134 wax, 64% rosin ester polymer (Hercules Powder Co. Polypale No. 1), 1% naphthalene. | 112 | 65 | 142 |
| 8. 20% polyethylene, 15% 130/134 wax, 64% phenol formaldehyde resin (Rohm & Haas Co. Amberol ST-137), 1% naphthalene. | 114 | 85 | 144 |

*Example II*

An oil well treating composition is prepared by suspending solid particles of a polymer-wax-resin composition in a 38.7 gravity lease crude. The solid particles are a homogeneous mixture of 20 weight percent copolymer of ethylenevinyl actate, 15 weight percent 143/150 paraffin wax, and 65 percent rosin-modified phenol formaldehyde resin formed into solid, substantially spherical-shaped particles within the size range which will pass a number 6 U.S. Standard sieve and be retained on a number 20 U.S. Standard sieve. The particles are added to the carrier fluid in the proportion of 8.2 pounds of particles per gallon of fluid.

Various other changes and modifications of this invention are apparent from the foregoing description and examples and further modifications will be obvious to those skilled in the art. Such modifications and changes are intended to be included within the scope of this invention as defined in the following claims:

I claim:

1. A process for treating subterranean formations penetrated by a well bore comprising the step of injecting a treating fluid through said well bore and into said formation, said treating fluid comprising a pumpable carrier fluid having solid particles suspended therein, said solid particles comprising a homogeneous mixture of between about 20 and about 40 weight percent of a polymer component, between about 10 and about 60 weight percent of a wax component and between about 15 and about 70 weight percent of a resin component.

2. The process of claim 1 wherein said polymer component is selected from the group consisting of (1) addition polymers of an olefin having between two and four carbon atoms, (2) copolymers of an olefin having between two and four carbon atoms and an alkyl acrylate containing not more than 4 carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than four carbon atoms.

3. The process of claim 1 wherein said polymer component is selected from the group consisting of polyethylene, polypropylene, polybutylene, copolymer ethylene and vinyl acetate, and copolymer ethylene and methyl methacrylate.

4. The process of claim 1 wherein said wax component is a paraffin hydrocarbon wax.

5. The purpose of claim 1 wherein said resin component is selected from the group consisting of (1) rosin, (2) polymerized rosin, (3) esters of rosin and polymerized rosin, (4) phenolic and maleic-modified esters of rosin, (5) dimerized abietic acid, (6) esters of dimeric resin acids, (7) pentaerythritol esters of dimeric resin acids, (8) phthalate ester of hydroabietyl alcohol, (9) polymerized hydrocarbon resins, (10) phenol formaldehyde resin, (11) rosin-modified phenol formaldehyde resin, (12) polyterpene resin, (13) terpenephenol resins, (14) polymerized triazine formaldehyde resin, (15) fatty amides, (16) fatty diamines, and (17) maleic anhydride resin.

6. The process of claim 1 wherein said polymer component is a mixture of copolymer ethylene and vinyl acetate and copolymer ethylene and methyl methacrylate, said wax component is a paraffin hydrocarbon wax having a melting point between about 130° F. and about 165° F., and wherein said resin component is selected from the group consisting of (1) rosin, (2) polymerized rosin, (3) esters of rosin and polymerized rosin, (4) phenolic and maleic-modified esters of rosin, (5) dimerized abietic acid, (6) esters of dimeric resin acids (7) pentaerythritol esters of dimeric resin acids, (8) phthalate ester of hydroabietyl alcohol, (9) polymerized hydrocarbon resins, (10) phenol formaldehyde resin, (11) rosin-modified phenol formaldehyde resin, (12) polyterpene resin, (13) terpenephenol resins, (14) polymerized triazine formaldehyde resin, (15) fatty amides, (16) fatty diamines, and (17) maleic anhydride resin.

7. The process of claim 1 wherein said solid particles contain not more than about 10 percent by weight of a solubility modifier selected from the group consisting of (1) naphthalene, (2) aliphatic alcohols containing between about 12 and about 20 carbon atoms, and (3) alkyl substituted phenols where the alkyl group contains at least 3 and not more than 8 carbon atoms.

8. The process of claim 1 wherein said particles are substantially spherical in shape.

9. The process of claim 1 wherein said particles are within the size range passing a number 6 and being retained on a number 100 U.S. Standard sieve.

10. The process of claim 1 wherein the suspension of said solid particles in said carrier fluid contains between about ¼ pound and about 12 pounds of solid particles per gallon of carrier fluid.

11. A selective plugging process for temporarily sealing the hydrocarbon flow channels and permanently sealing the water flow channels of subterranean formations penetrated by a well bore comprising injecting a suspension of solid particles in a pumpable carrier fluid into said well bore under sufficient pressure to cause said suspended particles to enter said flow channels of said formation and to cause said channels to become plugged with said particles, said particles comprising a homogeneous mixture of between about 20 and about 40 weight percent of a polymer component, between about 10 and about 60 weight percent of a wax component and between about 15 and about 70 weight percent of a resin component.

12. A method of completing a well bore drilled into a subterranean formation comprising circulating a completion fluid from the surface to the drilling zone in said formation during the drilling operation and returning to the surface at least a portion of said completion fluid, said completion fluid comprising a liquid having suspended therein solid particles comprising a homogeneous mixture of between about 20 and about 40 weight percent of a polymer component, between about 10 and about 60 weight percent of a wax component and between about 15 and about 70 weight percent of a resin component.

13. A method of producing fractures in a subterranean formation penetrated by a well bore comprising injecting a fracturing fluid into said well bore at a pressure and at a volume flow rate sufficient to produce a fracture in said formation, said fracturing fluid having suspended therein solid particles of a homogeneous mixture of between about 20 and about 40 weight percent of a polymer component, between about 10 and about 60 weight percent of a wax component and between about 15 and about 70 weight percent of a resin component.

14. The method of claim 13 wherein said particles are of mixed sizes within the size range passing a number 20 and being retained on a number 100 U.S. Standard sieve.

15. The method of claim 13 wherein said particles are of mixed sizes within the size range passing a number 6 and being retained on a number 20 U.S. Standard sieve.

16. The method of claim 13 wherein about 50 weight percent of said particles are within the size range passing a number 6 and being retained on a number 20 U.S. Standard sieve, and about 50 weight percent of said particles are within the size range passing a number 20 and being retained on a number 100 U.S. Standard sieve.

17. The method of claim 13 wherein said particles are substantially spherical in shape and have the following size distribution: (1) between about 30 to 50 weight percent of said particles are within the size range passing a number 6 and being retained on a number 20 U.S. Standard sieve, (2) between about 10 to about 20 weight percent of said particles are within the size range passing a number 20 and being retained on a number 40 U.S. Standard sieve, between about 20 to about 30 weight percent of said particles are within the size range passing a number 40 and being retained on a number 60 U.S. Standard sieve, and (4) between about 10 and about 20 weight percent of said particles are within the size range passing a number 60 and being retained on a number 100 U.S. Standard sieve.

18. A method of producing fractures in a subterranean formation penetrated by a well bore comprising:
injecting a first fracturing fluid into said well bore at a pressure and at a volume flow rate sufficient to produce a fracture in said formation; and
injecting a second fracturing fluid through said well bore and into said fracture, said fluid having suspended therein a mixture of solid particulate propping agents comprising a permanent propping agent selected from the group consisting of sand, glass beads and crushed walnut shells, and a temporary propping agent comprising solid particles of a homogeneous mixture of between about 20 and about 40 weight percent of a polymer component, between about 10 and about 60 weight percent of a wax component and between about 15 and about 70 weight percent of a resin component.

19. The method of claim 18 wherein said mixture contains an equal volume of said permanent propping agent and said temporary propping agent, and wherein said mixture is initially injected into said well bore as a suspension in said carrier fluid of approximately ½ pound of solid propping agent mixture per gallon of fluid, and whereupon the solid mixture content of said fluid injected into said well bore is increased to not more than about 12 pounds of solid mixture per gallon of fluid.

20. A method of producing fractures in a subterranean formation penetrated by a well bore comprising:
injecting a first portion of a fracturing fluid into said well bore at a pressure and at a volume flow rate sufficient to produce a fracture in said formation;
subsequently injecting through said well bore and into said fracture, a second portion of said fracturing fluid having suspended therein a propping agent to maintain said fracture open when said fracturing fluid pressure is released; and
sealing said plugged fracture by injecting there-into a third portion of said fracturing fluid having suspended therein a selective plugging agent, said selective plugging agent comprising solid particles of a homogeneous mixture of between about 20 and about 40 weight percent of a polymer component, between about 10 and about 60 weight percent of a wax component, and between about 15 and about 70 weight percent of a resin component.

21. A method of producing multiple fractures in a subterranean formation penetrated by a well bore comprising:
fracturing said formation by injecting a fracturing fluid into said well bore at a pressure and at a volume flow rate sufficient to produce at least one fracture in said formation;
propping said fracture to maintain said fracture open when said fracturing fluid pressure is released by depositing therein a solid particulate propping material, said propping material being injected into said well bore as a suspension in said fracturing fluid;
sealing said fracture by depositing therein a selective plugging agent comprising solid particles of a homogeneous mixture of between about 20 and about 40 weight percent of a polymer component, between about 10 and about 60 weight percent of a wax component and between about 15 and about 70 weight percent of a resin component, said plugging agent being injected into said well bore as a suspension in said fracturing fluid; and
repeating said fracturing, propping and sealing steps until a desired number of fractures are formed in said subterranean formation.

22. A method of producing fractures in a subterranean formation penetrated by a well bore comprising:
  plugging naturally occurring fractures and flow channels in said formation by injecting through said well bore, and into said fractures and flow channels, a fluid having suspended therein a first plugging agent comprising solid particles of a substantially spherical shape and of a size within the range passing a number 6 and being retained on a number 100 U.S. Standard sieve, said solid particles being a homogeneous mixture of between about 20 and about 40 weight percent of a polymer component, between about 10 and about 60 weight percent of a wax component and between about 15 and about 70 weight percent of a resin component;
  injecting an initial portion of a fracturing fluid into said well bore at a pressure and at a volume flow rate sufficient to produce a fracture in said formation;
  after said injection of said initial portion of said fracturing fluid, suspending in said fluid injected into said well bore approximately ½ pound of a solid propping agent mixture per gallon of fluid, said propping agent mixture comprising about 50 volume percent of a permanent propping agent selected from the group consisting of sand, glass beads and crushed walnut shells, and about 50 volume percent of a temporary plugging agent comprising substantially spherically shaped solid particles of a homogeneous mixture having a composition within the range of said first plugging agent composition and a size within the range passing a number 6 and being retained on a number 20 U.S. Standard sieve; and
  gradually increasing said addition of propping agent mixture to said fluid to an amount not exceeding 12 pounds of solid propping agent per gallon of fluid.

23. A composition for injection into an earth formation comprising a pumpable carrier liquid having suspended therein solid particles comprising a homogeneous mixture of between about 20 and about 40 percent by weight of a polymer component, between about 10 and about 60 percent by weight of a wax component and between about 15 and about 70 percent by weight of a resin component.

24. The composition of claim 23 wherein said polymer component is selected from the group consisting of (1) addition polymers of olefins having between 2 and 4 carbon atoms, (2) copolymers of an olefin having between 2 and 4 carbon atoms and an alkyl acrylate containing not more than 4 carbon atoms in the alkyl group, (3) copolymers of an olefin having between 2 and 4 carbon atoms and an ester formed by the reaction of butenic acid and an alcohol having no more than 4 carbon atoms, and (4) copolymers of olefins having between 2 and 4 carbon atoms and an ester formed by the reaction of acetic acid and an unsaturated alcohol having no more than 4 carbon atoms.

25. The composition of claim 23 wherein said wax component is a paraffin hydrocarbon wax.

26. The composition of claim 23 wherein said resin component is selected from a group consisting of (1) rosin, (2) polymerized rosin, (3) esters of rosin and polymerized rosin, (4) phenolic and maleic-modified esters of rosin, (5) dimerized abietic acid, (6) esters of dimeric resin acids, (7) pentaerythritol esters of dimeric resin acids, (8) phthalate ester of hydroabietyl alcohol, (9) polymerized hydrocarbon resins, (10) phenol formaldehyde resin, (11) rosin-modified phenol formaldehyde resin, (12) polyterpene resin, (13) terpenephenol resins, (14) polymerized triazine formaldehyde resin, (15) fatty amides, (16) fatty diamines, and (17) maleic anhydride resin.

27. The composition of claim 23 wherein said solid particles contain not more than about 10 percent by weight of a solubility modifier selected from the group consisting of (1) naphthalene, (2) aliphatic alcohols containing between about 12 and about 20 carbon atoms, and (3) alkyl substituted phenols where the alkyl group contains at least 3 and not more than 8 carbon atoms.

28. The composition of claim 23 wherein said particles are within the size range passing a number 6 and being retained on a number 100 U.S. Standard sieve, and wherein the suspension of said solid particles in said carrier fluid contains between about ¼ pound and about 12 pounds of solid particles per gallon of carrier fluid.

References Cited by the Examiner
UNITED STATES PATENTS

| | | | |
|---|---|---|---|
| 2,788,072 | 4/1957 | Goodwin | 166—42 |
| 2,879,847 | 3/1959 | Irwin | 166—42 |
| 3,237,693 | 3/1966 | Huitt | 166—42 |
| 3,259,190 | 7/1966 | Parsons | 166—42 |

CHARLES E. O'CONNELL, *Primary Examiner.*

N. C. BYERS, *Assistant Examiner.*